No. 832,225. PATENTED OCT. 2, 1906.
A. B. WRIGHT.
SCRAPER FOR FENDER OR OTHER DISKS.
APPLICATION FILED OCT. 18, 1905.
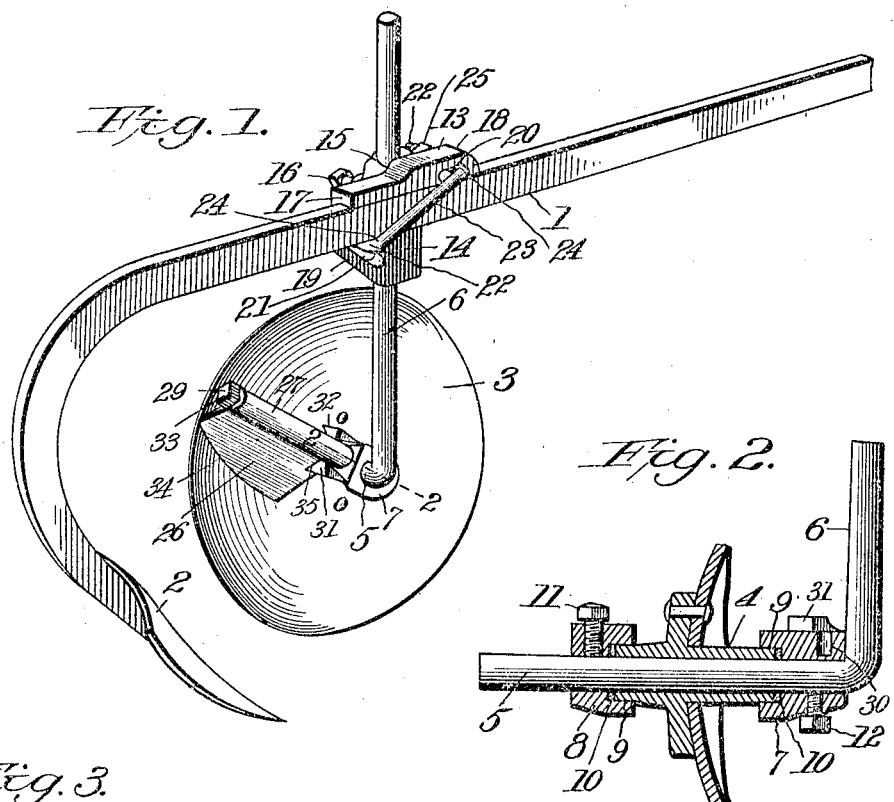
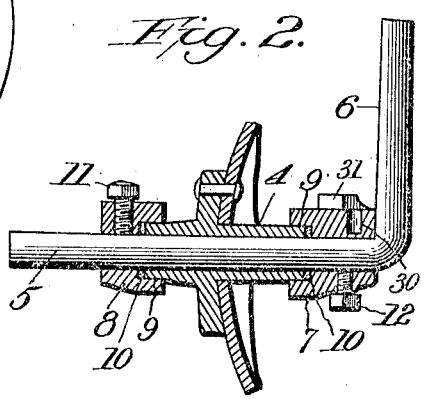
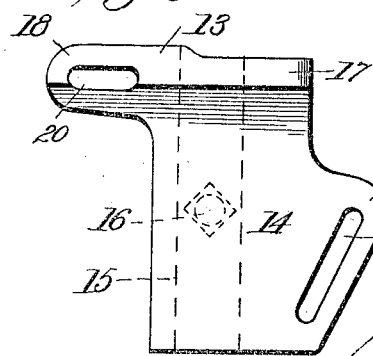
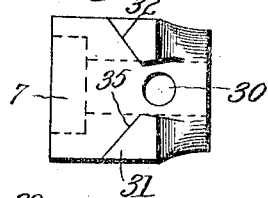
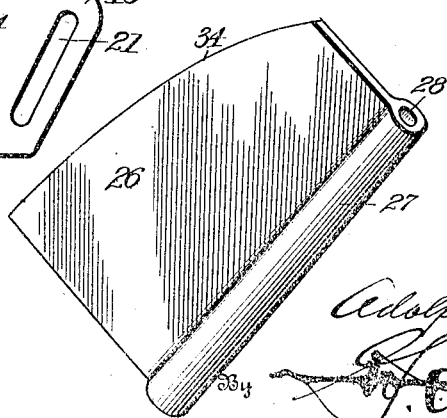
Witnesses
C. H. Walker
J. T. Walker
Inventor
Adolph B. Wright
By
Attorney

UNITED STATES PATENT OFFICE.

ADOLPH BENJAMIN WRIGHT, OF COUNCIL BLUFFS, IOWA.

SCRAPER FOR FENDERS OR OTHER DISKS.

No. 832,225.  Specification of Letters Patent.  Patented Oct. 2, 1906.

Application filed October 18, 1905. Serial No. 283,284.

*To all whom it may concern:*

Be it known that I, ADOLPH BENJAMIN WRIGHT, a citizen of the United States, residing at Council Bluffs, in the county of Pottawatomie and State of Iowa, have invented certain new and useful Improvements in Scrapers for Fenders or other Disks, of which the following is a specification.

This invention relates to scrapers.
One object is to provide an exceedingly simple, inexpensive, durable, and efficient scraper.

Another object resides in the provision of a combined fender of the disk variety and a scraper therefor.

A further object of the invention is to provide a scraper for disks of various types so mounted as to lie normally out of contact with the disk and to engage the same automatically to relieve it of foreign matter.

It is still further desired to construct a fender of the nature stated whereby it may be quickly attached to or detached from a beam of a cultivator, its disposition being preferably slightly in advance of the inside shovel to operate upon the surface-soil to any desired depth and prevent the surface soil, weeds, clods, or other foreign matter being thrown toward the rows of corn or the like while the said inside shovel is throwing subsoil toward the row.

With these and other objects in view the present invention consists in the combination and arrangement of parts, as will be hereinafter more fully described, shown in the accompanying drawings, and particularly pointed out in the appended claims, it being understood that changes in the form, proportion, size, and minor details may be made within the scope of the claims without departing from the spirit or sacrificing any of the advantages of the invention.

In the drawings, Figure 1 is a perspective view of my invention connected with the beam of a cultivator. Fig. 2 is a transverse sectional view on the line 2 2 of Fig. 1. Fig. 3 is a detail view of a clamping member similar to the clamping member shown in Figs. 1 and 2, but designed for engagement with a beam to reverse the disposition of the fender with respect to the cultivator. Fig. 4 is a detail view of the hub-engaging collar of the fender provided with oppositely-disposed shoulders, and Fig. 5 is a detail view of the cleaning element.

Referring now more particularly to the accompanying drawings, the reference character 1 designates a portion of a beam, and 2 a shovel connected up with the beam in the usual manner

My improved fender is in the form of a concavo-convex-shaped rotatable disk 3, provided with a hub 4, whereby it may be mounted for rotation upon the lower horizontal end 5 of a hanger 6, which latter is secured to the beam in the manner hereinafter explained. Slidably disposed upon the horizontal portion 5 of the hanger 6 are collars 7 and 8, each having a recess 9 formed about its central bore and in the corresponding face to receive the respective ends of the hub 4 of the disk-fender 3, there being a suitable washer 10 disposed between the corresponding end of the hub 4 and the bottom of the corresponding recess 9 of the collars 7 and 8. By reason of the fact that the inner face of the collar 7 is disposed adjacent the upright portion of the hanger 6 and the fact that the collar 8 is provided with a set-screw 11 it is obvious that the hub 4 of the disk fender may be so disposed with respect to the collar 7 and 8 as to prevent it becoming accidentally disengaged from its axis 5. If preferred, a set-screw 12 may be asociated with the collar 7 for engagement with the axle 5, so that the disk fender may be adjusted longitudinally of the axle 5 of the hanger 6. It will be understood that the ends of the hub 4 are engaged loosely in the corresponding recess of the collars 7 and 8 to permit of free rotation of the disk fender 3.

In order to secure the hanger 6 to the beam 1 slightly in advance of the shovel 2, I provide a clamping-block 13, having one flat side 14 for engagement with the corresponding side of the beam 1, and also provided with a bore 15 for the reception of the hanger 6. The hanger 6 may be adjusted vertically in the bore 15 of the clamping-block 13 by means of a suitable set screw 16, and it will be observed that the upper end of the clamping-block 13 is provided with a radially-directed flange 17 for engagement with the upper face of the beam 1. This clamping-block 13 is provided with an upper ear 18 and a lower ear 19, the said ears being arranged upon opposite sides of the clamping-block. The ear 13 includes a portion of the radially-directed flange 17, and through the same is formed a short horizontal slot

20, there being a slot 21 formed through the ear 19 downwardly and upon an incline, as shown. These slots 20 and 21 of the respective ears are designed to receive the oppositely-disposed legs 22 of the U-shaped key 23, whose bight portion 24 extends upon the opposite side of the beam from that upon which the clamping-block 13 is disposed. The free extremities of the legs 22 may be screw-threaded for the reception of suitable nuts 25. This key 23 may be termed a "clamping" member for coöperation with the clamping member 13, and by reason of the detachable engagement of the clamping member 23 with respect to the clamping-block 13, or, vice versa, it is obvious that the clamping members, together with the fender itself, may be readily placed upon or removed from the beam 1. It is obvious also that the clamping members 13 and 23, and consequently the fender, may be adjusted longitudinally of the beam 1 to present the disk fender at different distances toward or away from the shovel 2. While dwelling upon this feature of the invention, it might be remarked that the clamping-block 13 may be reversed in form, as shown in Fig. 3, for disposition upon the opposite side of the beam 1, whereby the device is adapted for right or left use with respect to the cultivator.

From the foregoing it will be understood that the disk fender 3 is rotatable upon its axle and that it may be adjusted vertically with respect to the beam 1 by reason of the vertical adjustment provided for the hanger 6 through the instrumentality of the setscrew 16. Since the hanger 6 is circular in section, corresponding to the bore 15 of the clamping member 13, it is obvious that the hanger 6 may be revolved therein to present the disk fender 3 at various angles with respect to the plane of the beam 1 or the shovel 2, so as to regulate not only the line of travel of the disk fender, but also the quantity of weeds, surface-soil, and other foreign matter to be thrown toward the shovel and not toward the rows.

I provide means for automatically cleaning the disk fender. This automatic means consists of a scraper 26, whose rear edge 27 is enlarged and provided with a bore 28, circular in cross-section, whereby the scraper may be mounted for lateral movement upon a bolt 29, which is removably fitted in the recess 30 in the top of the aforesaid collar 7. This recess 30 is disposed between two shoulders 31 and 32 for a purpose presently explained. The bolt 29 is provided with a head 33 at its upper outer end to prevent accidental disengagement of the scraper 26 from the bolt. As shown in the drawings, the bolt 29, and consequently the scraper 26, is normally out of contact with the disk 3, lying against the inclined face 35 of the shoulder 31, whereby it cannot move a great distance from the disk. When the disk is free of foreign matter, the scraper 26 does not engage therewith; but in the event foreign matter should cling to the concaved face of the disk 3 it would engage the beveled edge 34 of the scraper 26 and throw the latter into engagement with the disk, thereby relieving the latter of such foreign matter. The shoulder 32 is provided for the same purpose as the shoulder 31; but the shoulder 32 does not coöperate with the shoulder 31, the shoulder 32 being designed particularly for coöperation with the scraper 26 when the fender is changed for operation from the right to the left side, or vice versa. It will thus be seen that my improved cleaning element 26 operates automatically to relieve the disk shield or fender of any foreign matter that may cling to its concave face.

In the use of my invention the surface-soil, weeds, and the like are operated upon prior to the subsoil. Hence the disk-shaped fender or shield 3 throws the surface-soil, weeds, &c., away from the row, while the cultivator-shovel follows immediately thereafter and throws the subsoil toward the row. This is one of the main objects of the invention, and the essential characteristics have been fully set forth in the foregoing description Obviously my improved scraper is equally applicable to cultivator, harrow, or other disks, and I propose to use the same in such connection. It will therefore be understood that my claims are drawn with the object in view of protecting the scraper in this latter application.

What is claimed is—

1. The combination with a hanger and a disk turning thereon, of a scraper supported from the hanger normally out of contact with the disk and free to swing on an axis radial to the disk.

2. The combination with a rotary disk, of a scraper swinging about an axis radial to the disk, the scraper being normally out of contact with the disk and in the path of accumulations upon the disk for movement by contact therewith into engagement with the disk to remove foreign matter from the latter.

3. The combination with a rotary disk, of a reversible scraper swinging about an axis radial to the disk, the scraper being normally out of contact with the disk and in the path of accumulations upon the disk for movement by contact therewith into engagement with the disk to remove foreign matter from the latter.

4. In a cultivator the combination with a beam and a shovel, of a hanger mounted upon the beam, a rotary disk carried by the hanger, and a scraper mounted to swing upon an axis radial to the disk, the scraper being normally out of contact with the disk.

5. The combination with a rotary disk, of a scraper free to swing about an axis radial to the disk, and means for limiting the movement of the scraper away from the disk.

6. The combination with a rotary disk, of a reversible scraper free to swing about an axis radial to the disk, and means for limiting the movement of the scraper away from the disk.

7. In a cultivator, the combination with a beam and a shovel; of a hanger mounted upon the beam and having its lower end bent to form an axle, clamping members engaging the beam and the hanger to provide for an adjustment of the hanger longitudinally of the beam; a rotatable fender mounted upon the axle, a collar mounted upon the axle upon each side of the fender, one of the collars having oppositely-disposed shoulders and a recess therebetween; a bolt mounted in said recess; a scraper mounted upon said bolt to lie normally out of contact with the fender and in engagement with one of said shoulders, said scraper being thrown into engagement with the fender automatically to remove foreign matter from the latter.

8. The combination with a hanger and a disk turning thereon, of a scraper supported from the hanger and turning upon an axis radial to the disk, the scraper being normally out of contact with the disk and in the path of accumulations thereon for engagement therewith to remove foreign matter from the disk.

9. The combination with a rotary disk, of a scraper free to swing about an axis radial to the disk, the scraper being normally out of contact with the latter.

In testimony whereof I affix my signature in the presence of two subscribing witnesses.

ADOLPH BENJAMIN WRIGHT.

Witnesses:
  DAVID M. MEYER,
  GEO. WRIGHT.